(12) United States Patent
Proctor et al.

(10) Patent No.: US 8,519,349 B2
(45) Date of Patent: Aug. 27, 2013

(54) SCINTILLATOR PANEL HAVING UNIFORM OUTPUT RESPONSE

(75) Inventors: Alan E. Proctor, Knoxville, TN (US); James R. Sheldon, Clinton, TN (US)

(73) Assignee: Nucsafe, Inc., Oak Ridge, TN (US)

( * ) Notice: Subject to any disclaimer, the term of this patent is extended or adjusted under 35 U.S.C. 154(b) by 216 days.

(21) Appl. No.: 12/941,679

(22) Filed: Nov. 8, 2010

(65) Prior Publication Data

US 2012/0112082 A1 May 10, 2012

(51) Int. Cl.
*G01T 1/20* (2006.01)
(52) U.S. Cl.
USPC .................................... 250/370.11
(58) Field of Classification Search
USPC .................................... 250/370.11
See application file for complete search history.

(56) References Cited

U.S. PATENT DOCUMENTS

| | | | | |
|---|---|---|---|---|
| 5,317,158 | A * | 5/1994 | McElhaney et al. | 250/367 |
| 7,750,306 | B2 * | 7/2010 | Menge et al. | 250/368 |
| 2006/0192308 | A1 * | 8/2006 | Juni | 264/1.21 |
| 2009/0026375 | A1 * | 1/2009 | Doshi | 250/366 |

OTHER PUBLICATIONS

High Energy Cosmic Rays, Detector Parts, http://www2.slac.stanford.edu/vvc/cosmicrays/ccrtparts.html, Nov. 18, 2010.

* cited by examiner

*Primary Examiner* — David Porta
*Assistant Examiner* — Djura Malevic
(74) *Attorney, Agent, or Firm* — Luedeka Neely Group, P.C.

(57) ABSTRACT

A scintillator panel assembly for gamma ray detection includes a scintillator panel having fluorescent material therein for generating a photon when a gamma ray enters the panel, and one or more non-scintillating segments embedded in opposing edges of the scintillator panel which conduct light but do not generate a photon when a gamma ray enters. One or more photon detectors, such as photomultiplier tubes, are disposed immediately adjacent the one or more non-scintillating segments for receiving photons conducted through the non-scintillating segments. The non-scintillating segments preferably have optical transmission and reflection properties that are substantially the same as the optical transmission and reflection properties of the scintillator panel. This configuration provides substantially uniform light output response for all photon generation locations which results in improved spectral resolution.

17 Claims, 1 Drawing Sheet

SCINTILLATOR PANEL HAVING UNIFORM OUTPUT RESPONSE

FIELD

This invention relates to scintillator panels used in gamma ray detection applications. More particularly, this invention relates to a plastic scintillator panel having substantially uniform light output response for all photon generation locations, which results in improved spectral resolution.

BACKGROUND

In plastic scintillator panels, gamma rays generate light pulses as they pass through the panel, and the energy of the light pulse is a function of the energy of the gamma ray. This energy dependent response can be exploited by digitizing the amplitude of light pulses from gamma ray captures and counting the pulses that fall into different energy ranges (also referred to as energy bins). Energy ranges are typically referred to as 8-bin "regions of interest" (ROI's) or 256-bin spectra. It is desirable for a scintillator panel to generate light pulses having approximately the same amplitude for gamma rays captured at any location in the panel. When the outputs of two photomultipliers (PMT's) disposed at opposite ends of a scintillator panel are summed, the panel output response is generally uniform. The exception to uniform response occurs when gamma rays intersect portions of the panel that are in close proximity to the PMT's.

What is needed is a scintillator panel and PMT assembly that provides substantially uniform output response, even when gamma rays strike the panel in close proximity to the PMT's.

SUMMARY

The above and other needs are met by a scintillator panel assembly for gamma ray detection. A preferred embodiment of the assembly includes a scintillator panel having fluorescent material therein for generating a photon when a gamma ray enters the panel. One or more non-scintillating segments are embedded in the scintillator panel which conduct light but do not generate a photon when a gamma ray enters. One or more photon detectors are disposed immediately adjacent the one or more non-scintillating segments for receiving photons conducted through the non-scintillating segments.

In some preferred embodiments, the scintillator panel assembly includes a substantially rectangular scintillator panel having a length greater than its width, having a first edge along the width of the panel and a second edge opposite the first edge. In these preferred embodiments, a first non-scintillating segment is embedded in the first edge of the scintillator panel and a second non-scintillating segment is embedded in the second edge of the scintillator panel. The first and second non-scintillating segments preferably have optical transmission and reflection properties that are substantially the same as the optical transmission and reflection properties of the scintillator panel. A first photon detector is disposed immediately adjacent the first non-scintillating segment for receiving photons conducted through the first non-scintillating segment. A second photon detector is disposed immediately adjacent the second non-scintillating segment for receiving photons conducted through the second non-scintillating segment. The second photon detector is preferably separated from the first photon detector by a distance that is approximately the length of the scintillator panel.

In preferred embodiments, the non-scintillating segments are semi-cylindrical, although other shapes may be implemented.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 2:
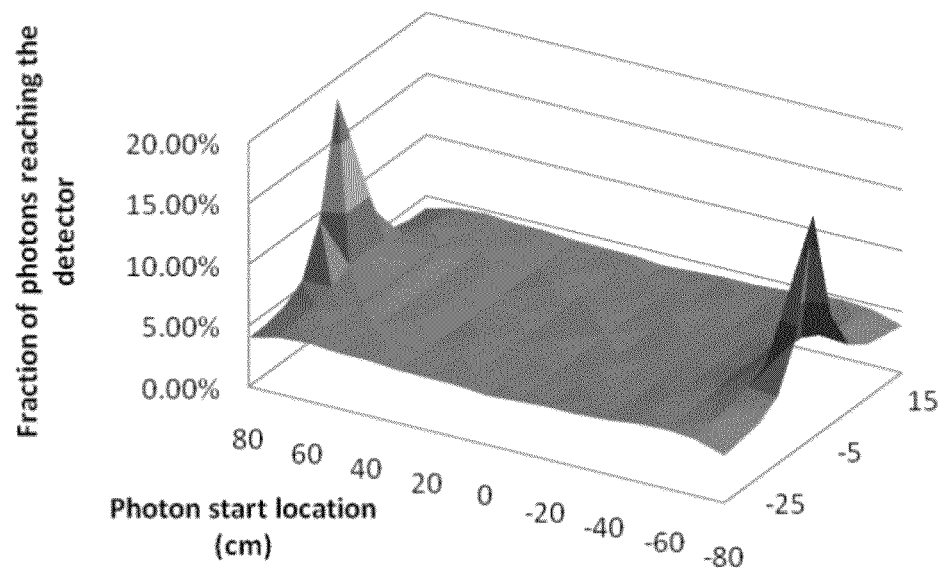
FIG. 2 depicts a graph of an output response of a conventional scintillator panel assembly.

A typical scintillation flat panel for detecting radiation employs a pair of photomultipliers (PMT's) disposed at opposite ends of a block of scintillation material. Software models have shown that scintillator panel response is generally uniform for the summed output of the two PMT's. However, as shown in FIG. 2, an exception to uniform response occurs in regions directly adjacent to the PMT's. The graph in FIG. 2 depicts the percentage of photons reaching two circles of 5 cm diameter disposed at opposite ends of the panel. This size approximately matches the size of standard PMT's positioned at the ends of a plastic scintillator panel. To generate data for this plot, a software model "started" groups of 50,000 photons at specified locations in a panel. All photons had the same starting point but had randomized trajectories. The model tracked individual photons with realistic reflection and absorption probabilities until they reached one of the two circles at the opposing ends of the panel or were lost due to transmission out of the panel or attenuation in the panel. The number of photons reaching either circle was then summed. In the model, photons started near one of the circles are "detected" much more efficiently than photons started away from the same circle due to the much more favorable solid angle available from the near locations. As FIG. 2 indicates, the number of photons reaching a nearby circle dominates. The inventors refer to this as the "optical bundle effect."

In gamma particle detection systems, such as stationary portal systems, it is desirable to eliminate this "optical bundle effect." For example, differences between ROI's are used in stationary portal systems to reduce the effects of "baseline depression." ROI difference calculations assume that each ROI contains counts that are due to gamma rays whose energies fall into a specified region. These calculations are accurate only if the scintillator panel has uniform response to gamma rays captured over the entire area of the panel.

Figure 1:
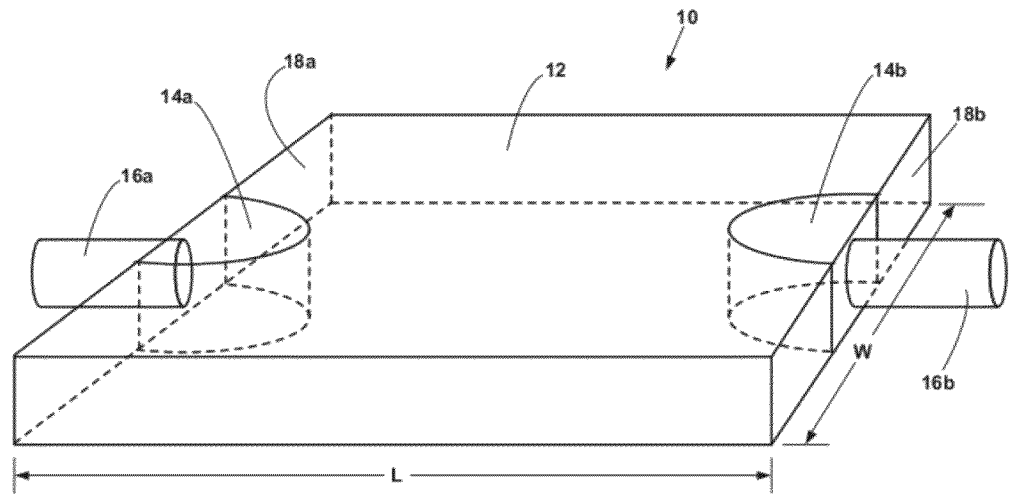
FIG. 1 depicts a preferred embodiment of a scintillator panel assembly.

FIG. 1 depicts an embodiment of a scintillator panel assembly 10 which eliminates the "optical bundle effect." The assembly 10 includes a plastic scintillator panel 12 having half-cylinder shaped non-scintillating light pipe segments 14a and 14b embedded at opposite edges 18a and 18b of the panel 12. The segment 14a is disposed in front of a photon detector 16a and the segment 14b is disposed in front of a photon detector 16b. In a preferred embodiment, the photon detectors 16a and 16b are photomultiplier tubes (PMT's). Also in a preferred embodiment, the panel 12 is made from polyvinyl toluene having a fluorescent dye which fluoresces when excited by a gamma ray passing through. The segments 14a and 14b are preferably made from a material having optical transmission and reflection properties, such as index of refraction, that are substantially the same as the material of the panel 12, except the segments 14a and 14b do not have the fluorescent properties of the panel 12. For example, the segments 14a and 14b may be made from polyvinyl toluene without the fluorescent dye.

Lacking the fluorescent dye, the segments 14a and 14b transmit light but do not generate photons when gamma rays are captured. Since no photons are generated in the segments 14a and 14b immediately adjacent the PMT's, there is no "optical bundle effect." As a result, any fluorescence generated by the panel 12 has a substantially constant relationship between the number of photons generated (which is proportional to the energy deposited by a captured gamma ray) and the number of photons reaching the PMT's 16a and 16b. Thus, the light pipe segments 14a and 14b immediately adjacent the PMT's 16a and 16b significantly improve the spectral resolution of the panel assembly 10.

In the embodiment depicted in FIG. 1, the segments 14a and 14b are semi-cylindrical, which is a practical shape that can be fabricated and embedded in the panel 12 at reasonable cost. However, one skilled in the art will appreciate that the segments 14a and 14b may have other shapes, such as rectangular, and that an optimal segment shape may be determined by modeling.

Embedding the non-scintillating segments 14a and 14b in the scintillator panel 12 reduces the overall efficiency of the panel 12 by the fraction of surface area occupied by the segments 14a and 14b. However, because the area of the scintillating portion of the panel 12 is large compared to the area of the non-scintillating segments 14a and 14b, the resolution improvement outweighs the loss of sensitivity. For example, a 160 cm long by 60 cm wide by 5 cm thick panel has a front surface area of 9600 cm$^2$. A substitution of portion of panel with the segments 14a and 14b, each having a radius of 15 cm, reduces the amount of scintillating surface area by 730 cm$^2$, which is only about 7% of the total surface area.

In preferred embodiments, the panel 12 is rectangular as shown in FIG. 1, with a length "L" that is greater than its width "W," and with the non-scintillating segments 14a and 14b disposed at opposing edges 18a and 18b corresponding to the width "W" of the panel 12. In other embodiments, the panel 12 is circular and the non-scintillating segments 14a and 14b are disposed at opposing edges at opposite sides of the circle. In yet other embodiments, the panel 12 is elliptical and the non-scintillating segments 14a and 14b are disposed at opposing edges at opposite ends of the ellipse. Thus, it should be appreciated that the invention is not limited by the shape of the panel 12.

In the preferred embodiment depicted in FIG. 1, embedding the light pipe segments 14a and 14b into the panel 12 does not increase the overall length of the panel 12. In general, the largest possible panel assembly—including PMT's, electronics, and structural hardware—is selected for a portal system. Increasing the overall length of a panel assembly by adding light pipe segments to the end of the panel, rather than embedding the segments, is often not a practical solution. However, one skilled in the art will appreciate that the benefits of the invention may be provided in an embodiment wherein the segments are added to the end of a panel rather being embedded therein. Thus, the invention is not limited to embedded segments.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A scintillator panel assembly for gamma ray detection comprising:
    a scintillator panel having fluorescent material therein for generating a photon when a gamma ray enters the panel, wherein the scintillator panel is formed from polyvinyl toluene having a fluorescent dye;
    one or more non-scintillating segments embedded in the scintillator panel, the one or more non-scintillating segments for conducting light but not generating a photon when a gamma ray enters the one or more non-scintillating segments, wherein the one or more non-scintillating segments are formed from polyvinyl toluene having no fluorescent dye; and
    one or more photon detectors disposed adjacent the one or more non-scintillating segments for receiving photons conducted through the one or more non-scintillating segments.

2. The scintillator panel assembly of claim 1 wherein optical transmission, index of refraction, and reflection properties of the one or more non-scintillating segments are substantially the same as optical transmission and reflection properties of the scintillator panel.

3. The scintillator panel assembly of claim 1 wherein the one or more non-scintillating segments are embedded at one or more edges of the scintillator panel.

4. The scintillator panel assembly of claim 3 wherein the one or more non-scintillating segments are semi-cylindrical.

5. The scintillator panel assembly of claim 3 wherein the one or more non-scintillating segments comprise a first non-scintillating segment disposed at a first edge of the scintillator panel and a second non-scintillating segment disposed at a second edge of the scintillator panel which is opposite the first edge.

6. The scintillator panel assembly of claim 5 wherein the one or more photon detectors comprise a first photon detector disposed immediately adjacent the first non-scintillating segment and a second photon detector disposed immediately adjacent the second non-scintillating segment.

7. The scintillator panel assembly of claim 6 wherein the scintillator panel is substantially rectangular and has a length greater than its width, and wherein the first and second photon detectors are separated by a distance that is approximately the length of the scintillator panel.

8. The scintillator panel assembly of claim 5 wherein the scintillator panel is substantially rectangular and has a length greater than or equal to its width, and wherein the width is associated with the first and second edges.

9. The scintillator panel assembly of claim 1 wherein the one or more photon detectors comprise one or more photomultiplier tubes.

10. The scintillator panel assembly of claim 1 wherein the scintillator panel is substantially circular.

11. The scintillator panel assembly of claim 1 wherein the scintillator panel is substantially elliptical.

12. A scintillator panel assembly for gamma ray detection comprising:
    a substantially rectangular scintillator panel having a length greater than or equal to its width, having a first outer edge disposed parallel to the width of the panel, and having a second outer edge disposed parallel to the width of the panel opposite the first outer edge, the panel comprising fluorescent material for generating a photon when a gamma ray enters the panel;

a first non-scintillating segment embedded into the first outer edge of the scintillator panel, the first non-scintillating segment for conducting light but not generating a photon when a gamma ray enters the first non-scintillating segment;

a second non-scintillating segment embedded into the second outer edge of the scintillator panel, the second non-scintillating segment for conducting light but not generating a photon when a gamma ray enters the second non-scintillating segment;

a first photon detector disposed immediately adjacent the first non-scintillating segment for receiving photons conducted through the first non-scintillating segment; and a second photon detector disposed immediately adjacent the second non-scintillating segment for receiving photons conducted through the second non-scintillating segment.

13. The scintillator panel assembly of claim 12 wherein the first non-scintillating segment is semi-cylindrical with a half-circular portion extending into the scintillator panel from the first outer edge of the scintillator panel and aplanar portion disposed adjacent the first outer edge, and the second non-scintillating segments is semi-cylindrical with a half-circular portion extending into the scintillator panel from the second outer edge of the scintillator panel and a planar portion disposed adjacent the second outer edge.

14. The scintillator panel assembly of claim 12 wherein the scintillator panel is formed from a material having a fluorescent dye, and the first and second non-scintillating segments are formed from a material having substantially the same optical transmission and reflection properties as the material from which the scintillator panel is formed except having no fluorescent dye.

15. The scintillator panel assembly of claim 12 wherein the first and second photon detectors comprise photomultiplier tubes.

16. The scintillator panel assembly of claim 12 wherein the first and second non-scintillating segments together occupy no more than about 7 percent of the surface area of the scintillator panel assembly.

17. A scintillator panel assembly for gamma ray detection comprising:

a scintillator panel having an upper surface and a lower surface, having a first outer edge disposed between the upper and lower surfaces, and having a second outer edge disposed between the upper and lower surfaces and opposite the first outer edge, the panel comprising fluorescent material for generating a photon when a gamma ray enters the panel;

a first non-scintillating segment embedded into the first outer edge of the scintillator panel, the first non-scintillating segment for conducting light but not generating a photon when a gamma ray enters the first non-scintillating segment;

a second non-scintillating segment embedded into the second outer edge of the scintillator panel, the second non-scintillating segment for conducting light but not generating a photon when a gamma ray enters the second non-scintillating segment;

a first photon detector disposed immediately adjacent the first non-scintillating segment for receiving photons conducted through the first non-scintillating segment; and a second photon detector disposed immediately adjacent the second non-scintillating segment for receiving photons conducted through the second non-scintillating segment.

* * * * *